United States Patent
Borgmeier et al.

(10) Patent No.: US 9,429,259 B2
(45) Date of Patent: *Aug. 30, 2016

(54) LINE CONNECTOR FOR MEDIA LINES

(71) Applicant: VOSS Automotive GmbH, Wipperfurth (DE)

(72) Inventors: Olav Borgmeier, Huckeswagen (DE); Eduard Bruck, Leverkusen (DE); Ulrich Erb, Koln-Porz (DE); Reiner Grundel, Gummersbach (DE); Martin Lechner, Lindlar (DE); Frank Peters, Lindlar (DE); Sascha Rosenfeldt, Wipperfurth (DE); Otfried Schwartzkopf, Kurten (DE); Ahmet Gunduz, Remscheid (DE); Marco Isenburg, Ratingen (DE)

(73) Assignee: VOSS Automotive GmbH, Wipperfurth (DE)

( * ) Notice: Subject to any disclaimer, the term of this patent is extended or adjusted under 35 U.S.C. 154(b) by 174 days.

This patent is subject to a terminal disclaimer.

(21) Appl. No.: 13/967,837

(22) Filed: Aug. 15, 2013

(65) Prior Publication Data

US 2013/0336643 A1      Dec. 19, 2013

Related U.S. Application Data

(63) Continuation of application No. 12/597,310, filed as application No. PCT/EP2008/053295 on Mar. 19, 2008, now Pat. No. 8,526,801.

(30) Foreign Application Priority Data

Apr. 26, 2007  (DE) .................... 20 2007 006 115 U
Jul. 9, 2007   (DE) .................... 20 2007 009 588 U
Aug. 28, 2007  (DE) ........................ 10 2007 040 786
Mar. 10, 2008  (DE) .................... 20 2008 003 365 U (51) Int. Cl.
*E03B 7/10*    (2006.01)
*F16L 25/01*   (2006.01)

(Continued)

(52) U.S. Cl.
CPC .............. *F16L 25/01* (2013.01); *F16L 53/008* (2013.01); *H05B 3/42* (2013.01); *F01N 2610/02* (2013.01);

(Continued)

(58) Field of Classification Search
None
See application file for complete search history.

(56) References Cited

U.S. PATENT DOCUMENTS 2,793,280 A    5/1957    Harvey
3,932,727 A    1/1976    True (Continued)

FOREIGN PATENT DOCUMENTS

DE    2746093 A1    4/1978
DE    27 49 093 A1  6/1978

(Continued)

OTHER PUBLICATIONS

Extract from "Lexikon der Chemie," Part 2, pp. 218, 219 and 224; and Part 3, pp. 90, 91, including English translation of relevant portions as outlined in the boxed paragraphs.

(Continued)

*Primary Examiner* — Thor Campbell
(74) *Attorney, Agent, or Firm* — Eric J. Sosenko; Jonathan P. O'Brien; Honigman Miller Schwartz and Cohn LLP (57) ABSTRACT

A line connector having a connector piece with at least one junction portion for junction connection to a media line or to an assembly, a transitional portion contiguous to the junction portion, and a flow duct. In at least the region of the transitional portion, an electrical heating element for the media line is provided in an arrangement at least partially surrounding the flow duct. The connector piece, together with the heating element, is surrounded by an outer cladding. At least one of the junction portions is designed as a hollow, cylindrical receptacle for directly plugging in the end of the media line, the media line being capable of being fastened in a materially integral manner. The junction portion including, at least in regions, a material transparent to laser beams in such a way that the media line can be fastened by way of laser welding.

7 Claims, 8 Drawing Sheets

(51) Int. Cl.
*F16L 53/00* (2006.01)
*H05B 3/42* (2006.01)
*F27B 14/00* (2006.01)
*H01R 13/00* (2006.01)

(52) U.S. Cl.
CPC ........ *F01N 2610/10* (2013.01); *F01N 2610/14* (2013.01); *H01R 13/005* (2013.01); *Y10T 137/5474* (2015.04); *Y10T 137/5907* (2015.04)

(56) References Cited

U.S. PATENT DOCUMENTS

| | | | |
|---|---|---|---|
| 4,069,409 A | | 1/1978 | Noland et al. |
| 4,334,141 A | * | 6/1982 | Roller et al. .................. 392/467 |
| 4,447,707 A | * | 5/1984 | Baker .......................... 392/472 |
| 4,616,894 A | * | 10/1986 | Baker .......................... 439/192 |
| 4,644,134 A | * | 2/1987 | Baker .......................... 392/472 |
| 4,815,769 A | * | 3/1989 | Hopperdietzel ................ 285/41 |
| 5,544,275 A | | 8/1996 | Ebbing et al. |
| 5,704,113 A | * | 1/1998 | Mak ................................ 29/611 |
| 5,791,377 A | | 8/1998 | LaRochelle |
| 5,832,178 A | * | 11/1998 | Schave ......................... 392/472 |
| 5,933,574 A | | 8/1999 | Avansino |
| 6,009,616 A | * | 1/2000 | Gellert .......................... 29/611 |
| 6,617,556 B1 | | 9/2003 | Wedel |
| 7,773,867 B2 | * | 8/2010 | Bourget et al. ............... 392/468 |
| 2005/0083638 A1 | | 4/2005 | Warren et al. |
| 2006/0144376 A1 | * | 7/2006 | Gschwind et al. ............ 123/573 |
| 2006/0252292 A1 | * | 11/2006 | Sonderegger et al. ........ 439/191 |
| 2007/0036528 A1 | * | 2/2007 | Ferrone ......................... 392/480 |
| 2007/0176418 A1 | * | 8/2007 | Frogneborn et al. .......... 285/242 |
| 2007/0257026 A1 | | 11/2007 | Tanaka et al. |
| 2008/0252071 A1 | * | 10/2008 | Lechner et al. ............... 285/319 |
| 2010/0144182 A1 | * | 6/2010 | Dude et al. .................... 439/193 |
| 2010/0253067 A1 | * | 10/2010 | Isenburg et al. ................ 285/41 |
| 2010/0263740 A1 | * | 10/2010 | Borgmeier et al. ........... 137/341 |
| 2010/0290764 A1 | * | 11/2010 | Borgmeier et al. ........... 392/468 |
| 2011/0006513 A1 | * | 1/2011 | Lechner et al. ............ 285/122.1 |
| 2011/0036081 A1 | * | 2/2011 | Lechner et al. ................. 60/303 |
| 2011/0248494 A1 | * | 10/2011 | Rosenfeldt et al. ............ 285/41 |
| 2011/0299838 A1 | * | 12/2011 | Galati et al. .................. 392/468 |
| 2012/0100735 A1 | * | 4/2012 | Rosenfeldt et al. .......... 439/190 |
| 2012/0311984 A1 | | 12/2012 | Mitsuda |
| 2013/0163970 A1 | * | 6/2013 | Schwarzkopf et al. ...... 392/478 |
| 2013/0333772 A1 | * | 12/2013 | Schwarzkopf et al. ...... 137/341 |

FOREIGN PATENT DOCUMENTS

| | | |
|---|---|---|
| DE | 199 02 431 A1 | 8/2000 |
| DE | 101 30 362 A1 | 1/2003 |
| DE | 10326894 B3 | 9/2004 |
| DE | 202005004602 U1 | 7/2005 |
| DE | 202006003590 U1 | 6/2006 |
| EP | 0 219 126 A2 | 4/1987 |
| EP | 0379635 A1 | 8/1990 |
| EP | 0543075 A1 | 5/1993 |
| EP | 0764810 A1 | 3/1997 |
| EP | 1 513 227 A1 | 3/2005 |
| EP | 1 557 601 A1 | 7/2005 |
| EP | 1710484 A1 | 10/2006 |
| EP | 1 777 452 A2 | 4/2007 |
| GB | 2423686 A | 8/2006 |
| JP | 51123223 U | 10/1976 |
| JP | 54051473 U | 4/1979 |
| JP | 2005193614 A | 7/2005 |
| WO | 9947805 A1 | 9/1999 |
| WO | 03021087 A1 | 3/2003 |
| WO | 2005124219 A1 | 12/2005 |
| WO | 2007/032034 A1 | 3/2007 |
| WO | 2007073286 A1 | 6/2007 |

OTHER PUBLICATIONS

International Search Report of PCT/EP2008/053295, mailed on Jul. 28, 2008, 6 pages.

* cited by examiner

LINE CONNECTOR FOR MEDIA LINES

CROSS REFERENCE TO RELATED APPLICATION

This application is a continuation of U.S. patent application Ser. No. 12/597,310, filed on Oct. 23, 2009, the entire contents of which are incorporated herein by reference.

BACKGROUND

1. Field of the Invention

The present invention relates to a line connector for media lines (pipelines or hose lines for, in particular, hydraulic flow media), comprising a connector piece with at least one junction portion for junction connection to a media line or to an assembly, and a transitional portion contiguous to the junction portion and having an inner flow duct.

The present invention relates, furthermore, to a ready-made media line, using a line connector of this type.

2. Description of the Known Technology

Line connectors serve for the mutual connection of at least two media lines or for the junction connection of at least one line to any assembly, in a motor vehicle. In this case, such media are often routed via the lines, which on account of a relatively high freezing point tend to freeze even at relatively high ambient temperatures possible under certain climatic conditions. Upon freezing of the media, specific functions may become impaired. This occurs, for example, in water lines for the windshield washing system and also in the case of lines for a urea solution which is used as an $NO_x$ reduction additive for diesel engines having SCR catalytic converters, as they are known.

A continual need and desire therefore exists to provide a line connector of the type mentioned, which is especially suitable for the preferred application mentioned and which prevents freezing of the respective medium in the connector region.

SUMMARY

One objective of the present invention is to make a ready-made line available for the purpose describe above. This is achieved, according to one aspect of the invention, by the line at least in the region of the transitional portion, that is to say outside the junction portion or junction portions, including electrical heating means in an arrangement surrounding the flow duct over its circumference at least partially, but preferably completely over 360°. This heating means can avoid or eliminate the freezing of the respective medium inside the connector piece, in that a medium which, for example, is frozen overnight when the vehicle is stationary is defrosted. In this case, the heating means are designed in such a way that a defined heating is ensured, along with good electrical insulation, good heat transmission, good mechanical properties and protection against mechanical damage and corrosion. By the ready-made line being continuously heated according to one aspect of the invention over the entire length, protection against freezing over the entire transport path of the medium is ensured.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The invention, advantageous refinements, and advantages achieved will be described in greater detail with reference to the exemplary embodiments illustrated in the appended drawings. The drawings described herein are for illustration purposes only and are not intended to limit the scope of the present disclosure in any way.

DETAILED DESCRIPTION

The following description is merely exemplary in nature and is in no way intended to limit the present invention or its application or uses. It should be understood that throughout the description and drawings, corresponding reference numerals indicate like or corresponding parts and features.

Referring to FIGS. 1-12, a line connector 1 according to the teachings of the present invention includes a connector piece 2 which is preferably formed as a one-piece molding from plastic, in particular from a fiber-reinforced polyamide such as PA6.6 GF30 or PA12 GF30. The connector piece 2 has at least one junction portion 6 for junction connection to a media line 4 (illustrated only in FIGS. 7 and 11) or to any assembly, not illustrated. Furthermore, the connector piece has a further junction portion 8 which lies opposite the junction portion 6 and which is designed in a known way, for example, as a socket part for a releasable plug connection. However, the junction portion 8 may also be formed as a plug portion.

In the preferred exemplary embodiments illustrated, the connector piece 2 is designed as an angle connector, the junction portions 6 and 8 forming with respect to their junction axes a specific, for example right angle (90°). In this case, the junction portions 6, 8 are connected via a transitional portion 10 which has an inner flow duct 11 which can be seen only in FIGS. 8, 11 and 12.

The connector piece 2 may also have any other desired configuration deviating from the examples illustrated, for example as a T-piece or distributor piece with three or more junction portions, as a rectilinear passage connector, as an angle connector (for example V-piece) with any desired junction axis angle deviating from a right angle) (90° or the like without exceeding the scope of the invention.

According to one aspect of the present invention, the connector piece 2 has, at least in the region of the transitional portion 10, electrical heating means 12 in an arrangement surrounding the flow duct 11 radially or circumferentially. As a result, the line connector 1 according to this aspect of the invention is suitable particularly for lines in motor vehicles for the routing of media, such as water or, in particular urea, which are at risk of freezing. The term "transitional portion" 10 will be understood by one skilled-in-the-art as meaning that region of the line connector 1 or of the connector piece 2 which, after the junction of lines (4) and/or after junction to an assembly, is still "exposed" and can therefore be provided with heating means 12.

Figure 1:
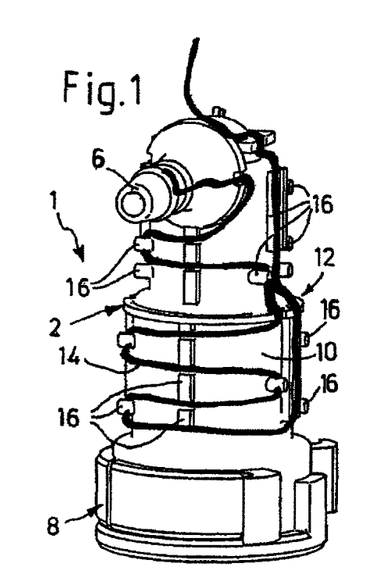
FIG. 1 shows a perspective view of one possible embodiment of a line connector constructed according to the teachings of the present invention.
Figure 2:
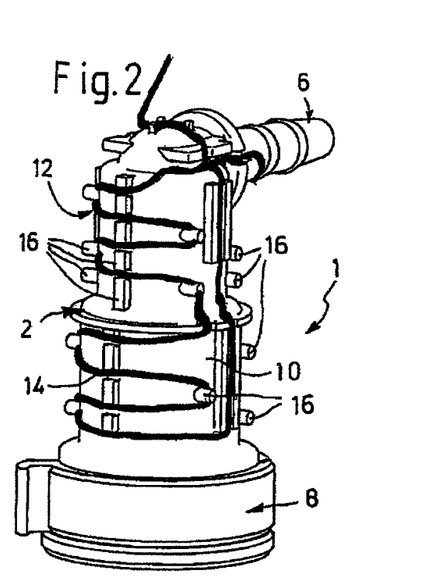
FIG. 2 shows a perspective view of another embodiment of a line connector constructed according to the teachings of the present invention.

As may be gathered from FIGS. 1 and 2, the heating means 12 provided may be at least one electrical resistance wire 14 in an arrangement running with an essentially uniform surface distribution at least over the region of the transitional portion 10. As may be gathered in this respect from FIGS. 1, 2, and 4 to 7, the connector piece 2 has on the outside, specific form elements for guiding and fixing the resistance wire 14 attached on the outside. Outwardly projecting extensions 16 or ribs and/or, for example, groove-shaped depressions 18 (see FIG. 4) may be provided as form elements. Depending on the configuration and arrangement of the form elements 16, 18, the resistance wire 14 may have, but not be limited to, a-meander-like or serpentine-like run in order to avoid a coil effect during a current flux (see FIGS. 1 and 2).

Figure 4:
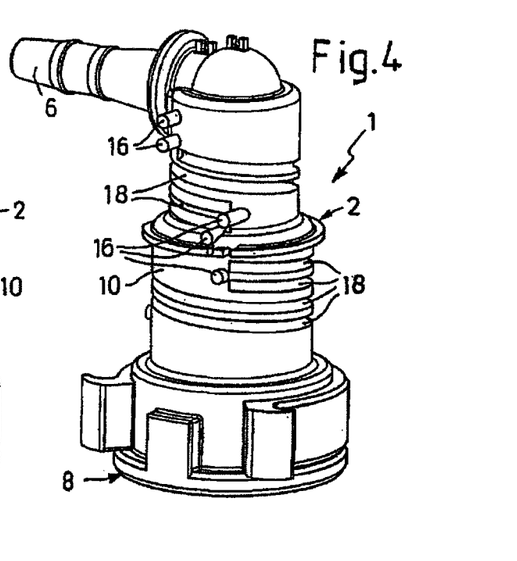
FIG. 4 shows a perspective view of yet another embodiment of a line connector according to one aspect of the present invention.
Figure 5:
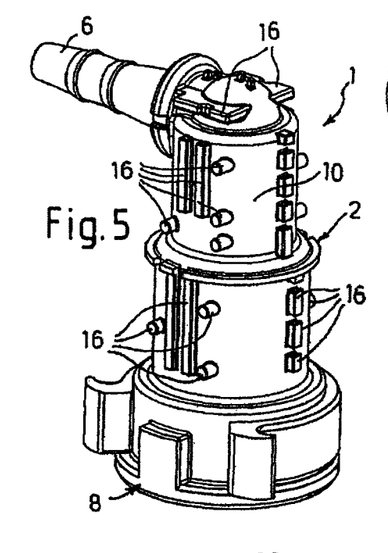
FIG. 5 shows a perspective view of a further embodiment of a line connector according to another aspect of the present invention.
Figure 6:
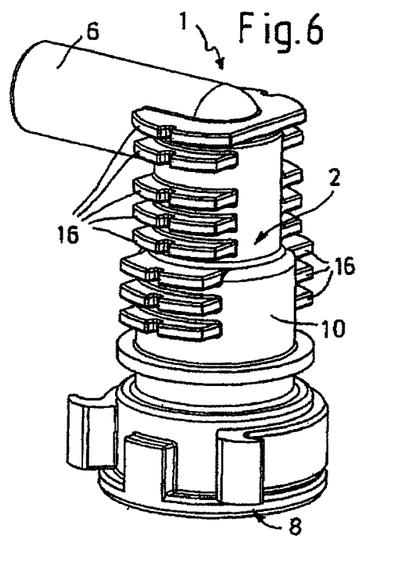
FIG. 6 shows a perspective view of yet another embodiment of a line connector constructed according to the teachings of the present invention.

Alternatively to this, however, the resistance wire 14 may also surround the connector piece 2 by being wound in a coil-like manner on the outside (see FIGS. 10 to 12) without exceeding the scope of the present invention. This is indicated in FIG. 4, for example, by a corresponding, helical profile of the groove-like depressions 18. In this case, advantageously, a second winding coil (not shown), which surrounds the flow duct, may be arranged in the inner region of the connector piece 2 in such a way that induction into the inner winding coil takes place by means of a current flux through the outer resistance wire 14.

The resistance wire 14 attached on the outside may be covered with an insulating coating comprised for example, of a coating powder or the like. This may also be a dip coating. Owing to the insulating coating, the resistance wire 14 itself may be produced without any specific insulation.

Figures 7, 8:
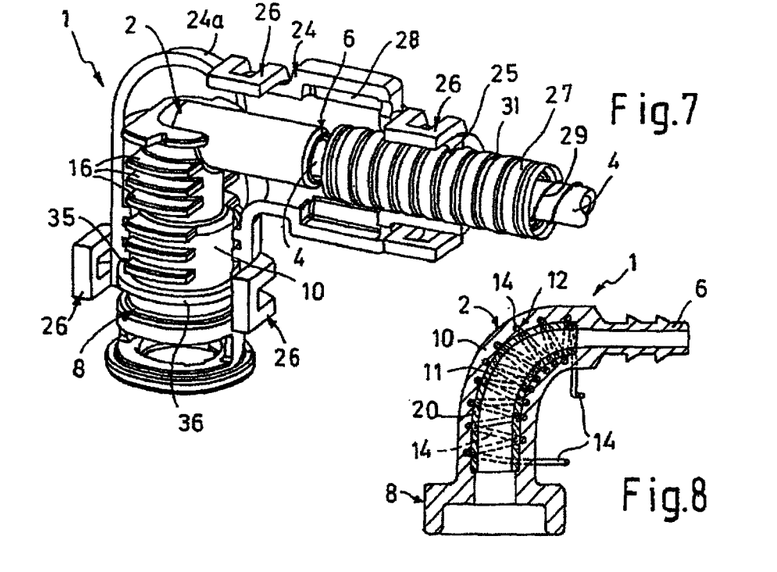
FIG. 7 shows a perspective view of yet another embodiment of a line connector constructed according to the teachings of the present invention.
FIG. 8 shows one version of the line connector in longitudinal section, constructed according to the teachings of the present invention.
Figure 9:
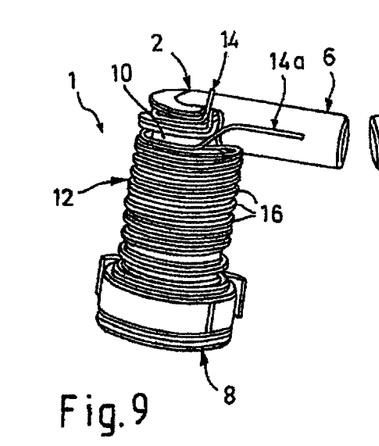
FIG. 9 shows a preferred version of the line connector according to one aspect of the present invention in a perspective view from a first viewing direction.
Figure 10:
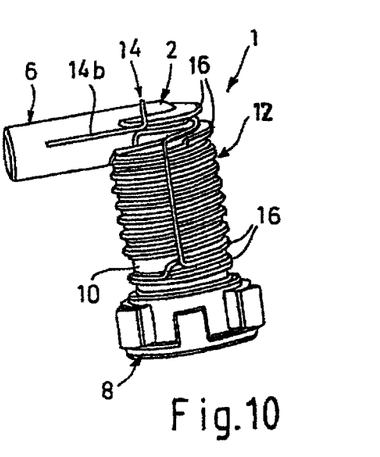
FIG. 10 shows a preferred version of the line connector according to one aspect of the present invention in a perspective view of the opposite side to that according to FIG. 9.

According to another aspect of the present invention, the resistance wire 14 may also be embedded (formed) into the material of the plastic connector piece 2. Reference is made in this respect to FIG. 8, according to which a tubular piece 20 is wound around with the resistance wire 14 and is introduced into an injection-molding die. The tubular piece 20 provided with the resistance wire 14 can then be injection-molded around with plastic in any desired way. The ends of the winding wire 14 are led outward so that a voltage can be applied. The tubular piece 20 may be made of plastic, but also of metal, in order to achieve good heat conduction inward into the flow duct 11.

Figure 3:
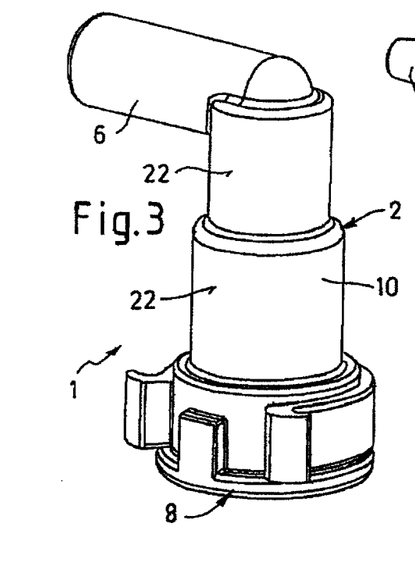
FIG. 3 shows a perspective view of another embodiment of a line connector constructed according to the teachings of the present invention.

In one design variant of the present invention illustrated in FIG. 3, a sheet-like heating element, not illustrated, for example in the form of a glued-on heating foil or of printed-on heating conductor tracks, may be provided on a smooth, for example, cylindrical outer face 22 of the connector piece 2. In another design variant, the material of the connector piece 2 itself may also be designed to be electrically conductive as heating means 12.

In order to achieve high heat conductivity, when the connector piece 2 is plastic, the plastic material may have specific fillers for increasing the heat conductivity. Suitable fillers are particles of aluminum $Al_2O_3$, glass fibers and/or carbon fibers, among others.

Referring to FIG. 7, the connector piece 2 may be surrounded by an outer cladding. The aspect of the present invention indicated in FIG. 7 may be a two-part outer housing 24 which includes two symmetrical housing halves 24a, 24b in the form of half shells (see FIGS. 11 and 12) and of which only one housing half 24a is illustrated in FIG. 7. In this case, the housing halves (24a, 24b) may advantageously be connected to one another via complementary latching means 26.

Alternatively, according to another aspect of the present invention, it is also possible, as cladding, for the entire connector piece 2 to be injection-molded around with an outer housing. Moreover, the cladding provided may also be what is known as a shrinkable tube, fabric tube or the like. Owing to the cladding, an air volume can be enclosed between the latter and the connector piece, with the result that good heat distribution, but also thermal insulation outwardly, are achieved. The outer coating or the cladding may bring about outward heat insulation. For this purpose, the plastic, without conductive fillers, is designed to have as low heat conductivity as possible.

In various aspects of the present invention where the resistance wire 14 is attached on the outside, the wire ends are preferably fastened via latching connections such that they project outward for contacting purposes. In the aspect of the present invention illustrated in FIGS. 9 to 12, the outer extensions 16, by means of a helical run, form a likewise helically running receptacle for the resistance wire 14. In this case, according to FIG. 9, the resistance wire 14 may run from a first wire end 14a, arranged in the region of the outer face of the junction portion 6, spirally over the region of the transitional portion 10 and then, according to FIG. 10, back again axially, so that a second wire end 14b likewise lies in the region of the outer face of the junction portion 6, approximately diametrically opposite the other wire end 14a. Thus, the wire ends 14a, 14b can be connected electrically to junction conductors or advantageously to heating conductors of the media line 4. The resistance wire 14 can therefore be supplied with electrical power (voltage, current), for example, via spiral heating conductors of the media line 4.

The heating means 12 may be designed with a power of 3 to 20 Watt and the resistance wire 14 may be designed with a length of, for example, up to 200 mm. For a connector piece 2 with an inner volume of the flow duct 11 in the range of 0.1 to 1.0 cm$^3$, a power quotient in the range of from 1 to 15 watts/cm$^3$ is preferred. The resistance wire 14 may be designed with a negative temperature coefficient (NTC) or with a positive temperature coefficient (PTC). A supply voltage of the order of 10 to a maximum of 14 volts is preferred.

The respective junction portion 6 may be designed as a junction gudgeon for the direct plugging on of a media line 4 (see, in this respect, FIGS. 1, 2, 4 and 5) or as a plug shank (FIGS. 3 and 6) capable of being plugged into a plug socket.

Referring now to FIGS. 7 and 9 to 11, the junction portion 6 may also be designed with, in particular, hollow-cylindrical form, a receptacle for directly plugging in the media line 4. In this case, the media line 4 is preferably fastened, for example adhesively bonded or welded, in the junction portion 6 in a materially integral manner. For welding by means of a laser beam, the junction portion 6 may consist at least in regions of a laser-transparent material.

As is illustrated, by the example of the junction portion 8, the latter may also be designed as a plug socket for receiving a plug shank. In this case, in regards to a plug connection, any desired means for the releasable locking of the plug connection parts may be provided. Reference is made in this respect, for example, to FIGS. 11 and 12.

Figures 11, 12:
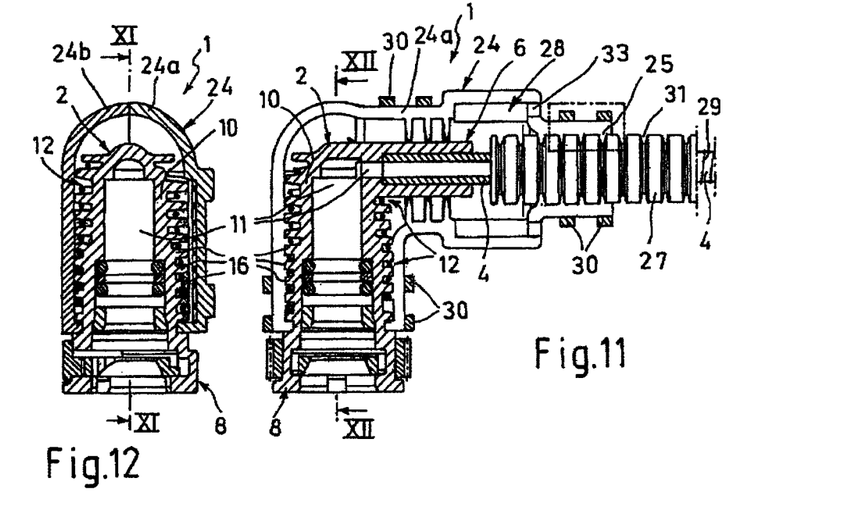
FIG. 11 shows a longitudinal section (sectional plane XI-XI according to FIG. 12) of the line connector according to FIGS. 9 and 10 with a housing half of an additional outer cladding and with a joined media line having additional sheathing and heating.
FIG. 12 shows a view of a section taken in the plane XII-XII according to FIG. 11 with both housing halves of the cladding.

As one skilled-in-the-art will understand from FIG. 7 and also from FIG. 11, it may be advantageous that in combination with the cladding, especially in the version as an outer housing 24, and in the case of a likewise self-heated media line 4, to provide the media line 4 with an additional sheathing 27 in the form of a corrugated tube surrounding the line 4. The sheathing 27 serves for mechanical protection and for thermal insulation for at least one heating conductor 29 running spirally around the media line 4. In this case, the sheathing 27 runs into the outer housing 24 and ends shortly before it reaches the junction portion 6. In this region, the outer housing 24 may have a widened chamber 28 for the reception of electrical connections (not shown) between the resistance wire ends 14a, 14b and the ends of the heating conductor 23 of the media line 4.

The outer housing 24 possesses, in the introduction region of the sheathing 27, the corrugated tube, ribs 25 which run around on its inner wall and which project into the wave troughs 31 of the corrugated tube. According to the invention, a form-fit connection between the outer housing 24 and the sheathing 27 is made. Moreover, it can be seen in FIG. 7 that a form-fit connection is likewise present between the outer housing 24 and the connector piece 2. For this purpose, the outer housing 24 has, in the region of the junction portion 8 of the connector piece 2, an inner slot 35, into which an annular collar 36 of the connector piece 2 projects.

Referring now to FIG. 11, the housing halves 24a, 24b of the outer housing 24 may also be connected via outer holding elements 30 designed, for example, in the manner of tension clips, tension wires or spring clamps.

Figure 13:
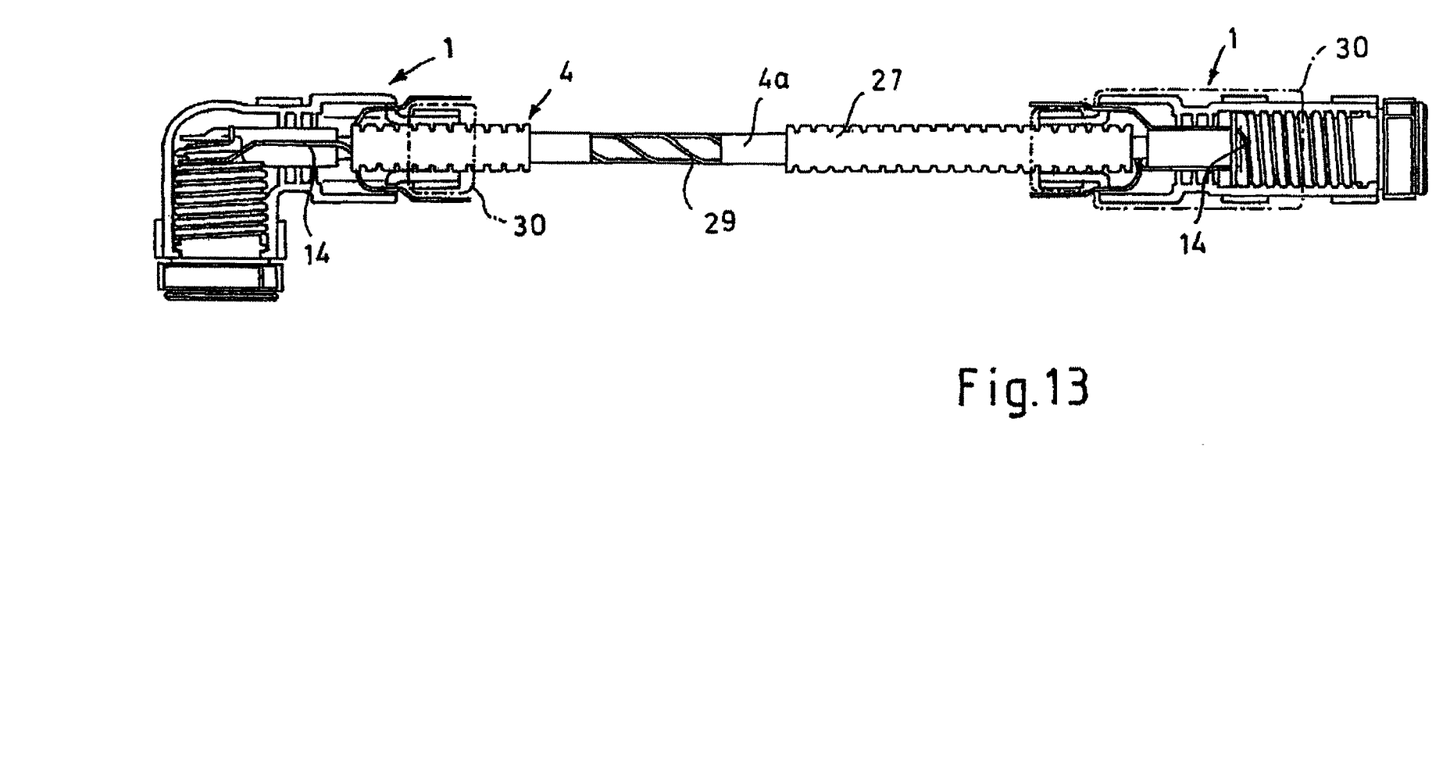
FIG. 13 shows a partially sectional side view of a ready-made media line constructed according one aspect of the present invention.

The present invention also embraces a ready-made media line, such as is illustrated in FIG. 13. This ready-made media line consists of an inner pipeline 4a with a heating conductor 29 arranged on the circumference, as is illustrated in FIG. 7. The pipeline 4a with the heating conductor 29 is surrounded by an outer sheathing 27. This outer sheathing 27 is preferably produced as a corrugated tube. This may be a ring-waved or a spiral-waved corrugated tube. As explained with regard to FIGS. 1 to 10, line connectors are joined in each case to the two ends of the media line 4 designed in this way.

In a preferred embodiment, a line connector 1, which is designed as an angle plug, is fastened at one end, and a straight plug junction is provided as a line connector 1 at the other end. In the examples illustrated in the present disclosure, the line connectors 1 are in each case designed at the end as a socket part, but they may likewise be designed as a plug part.

As illustrated in FIG. 13, the sheathing 27 is guided into the outer housing 24 of the line connector 1 and is connected with a form fit to the outer housing 24. The heating conductor 29 surrounding the pipeline 4a is wound spirally around the latter and is formed, in particular, from two wire windings 29a, 29b running in parallel. These two wire windings 29a, 29b may consist of one continuous wire, in which case the two junction ends are then present at the same pipeline end. However, they may also be formed from two separate wires.

The heating conductor 29 is preferably wound around with an adhesive tape and is thereby fixed to the pipeline 4a. Alternatively, it may likewise be possible that the heating conductor 29 is arranged on the pipeline 4a by means of an outer lacquer or adhesive layer. Particularly when different heating powers are desired along the pipeline 4a, the density of the number of turns and/or the electrical resistance may vary along the pipeline 4a, so that different heating powers can thereby be generated in portions, for example in siphon regions or in regions of the media line which are acted upon by relative wind and in which there is an increased tendency for the medium to freeze. The connector piece 2 present inside the line connector 1 may be connected to the pipeline 4a via a plug connection, but it is likewise within the scope of the invention if the pipeline 4a is connected to the connector piece 2 in a materially integral manner, for example by welding or adhesive bonding.

Furthermore, it is preferred when a defined air gap is formed between the pipeline 4a and the line sheathing 27. This may be achieved, for example, by the ring waviness itself or by means of spacers or the like arranged inside the corrugated tube. For better sealing off, it may likewise be advantageous, according to one aspect of the present invention, if a sealing compound 30 is introduced between the outer housing 24 of the line connector 1 and the connector piece 2, particularly in the region of connection of the line sheathing 27 to the line connector 1. The sealing compound 30, on the one hand, constitutes mechanical protection and, on the other hand, may also serve for improving the IP system of protection by sealing off. In FIG. 13, the arrangement of the sealing compound 30 is depicted by dashes. In this case, it is formed, for example in the transitional region of the angle plug 1 to the pipeline 27, only partially as a partial seal, and, in the case of the straight plug connection, the sealing compound 30 is formed both in the transitional region to the pipeline 27 and as an outer sheathing.

When the ready-made lines according to one aspect of the present invention have to be laid in the vicinity of heat-generating structural parts, it may be preferred if the ready-made line is surrounded, as seen over its length, completely or partially by a heat protection layer. This heat protection layer may be formed, for example, by a foil, such as a metalized foil reflecting heat radiation. Furthermore, for mechanical protection and for protection against rattling, an upholstering layer comprising, for example, of microcellular rubber or the like may also be applied, in particular, around the outer sheathing 27. It is also conceivable to also arrange an additional outer thermal insulation layer.

Figure 14:
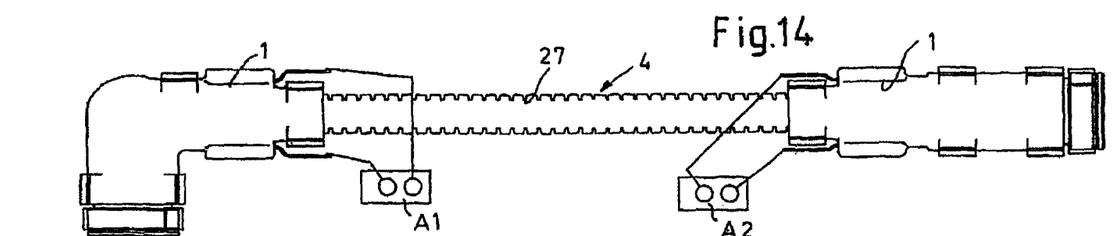
FIG. 14 shows a side view of the ready-made media line according to FIG. 13.
Figure 14A:
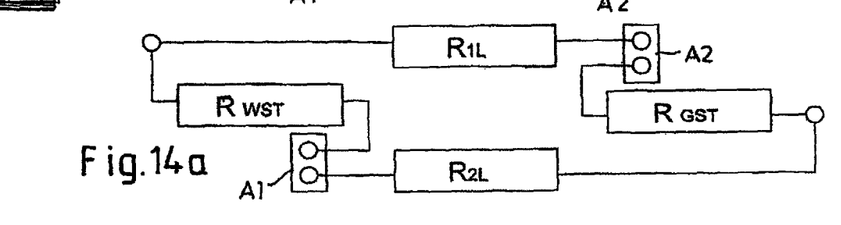
FIG. 14a is an electrical equivalent circuit diagram according to one aspect of the present invention showing the wiring of the resistance wires and heating conductors of FIG. 14.

The arrangement of an outer sheathing or of a protective layer or reinforcement is illustrated in section in FIG. 14, in portions, by the outer layer 27a. FIG. 14 illustrates how the resistance wires 14 of the line connectors 1 and the heating line 29 of the pipeline 4a can be wired electrically to one another. FIG. 14a illustrates that in each case the resistance wire of one of the line connectors 1 is connected electrically in series with one of the winding wires of the wire windings 29a, 29b, and the junction ends of these two series connections are led outward at the two line connectors 1, where a junction of a voltage supply and/or a further connection can then take place.

Figure 14B:
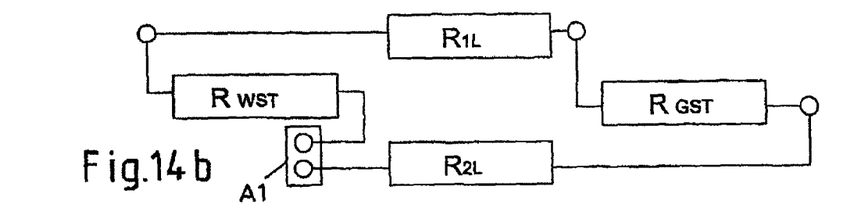
FIG. 14b is an electrical equivalent circuit diagram according to another aspect of the present invention showing the wiring of the resistance wires and heating conductors of FIG. 14.

In this case, $R_{WST}$ means the resistance of the resistance wire winding 14 of a line connector 1 which is designed in the example illustrated as an angle plug, and $R_{1L}$ means the electrical resistance of one of the wires of the wire windings 29a, 29b which surround the pipeline 4a. $R_{GST}$ is the resistance of the resistance wire 14 of the straight plug connector, and $R_{2L}$ is the electrical resistance of the other winding wire of the wire winding 29a, 29b around the pipeline 4a. The junctions lying outside the line connectors 1 are in each case identified by A1 and A2. Another wiring is illustrated in FIG. 14b. In this case, the resistance wires 14 of the line connectors 1 and those of the wire windings 29a, 29b are connected around the pipeline 4a in such a way that an electrical series connection of all the wires is afforded. The junction ends for the junction of a voltage supply of the series connection are led outward in the region of a line connector 1, and in this case the resistances of the individual wires are identified, as in FIG. 14a. In this case, only one outer line junction A1 is present. The magnitude of the individual resistances may vary in each case from one embodiment of a ready-made line according to the invention to another and depends on the heating power desired in each case.

It may be preferable, furthermore, to reduce the pitch of the resistance wire winding 14 at the end regions of the pipeline 4a. Another-configuration may involve arranging a further winding in the pipe end region of the pipeline 4a in addition to the circumferential winding 14 of the resistance wire, in order to make an additional wire length available. This affords the possibility, during contacting, of drawing wire out of the pipeline end.

Figure 15:
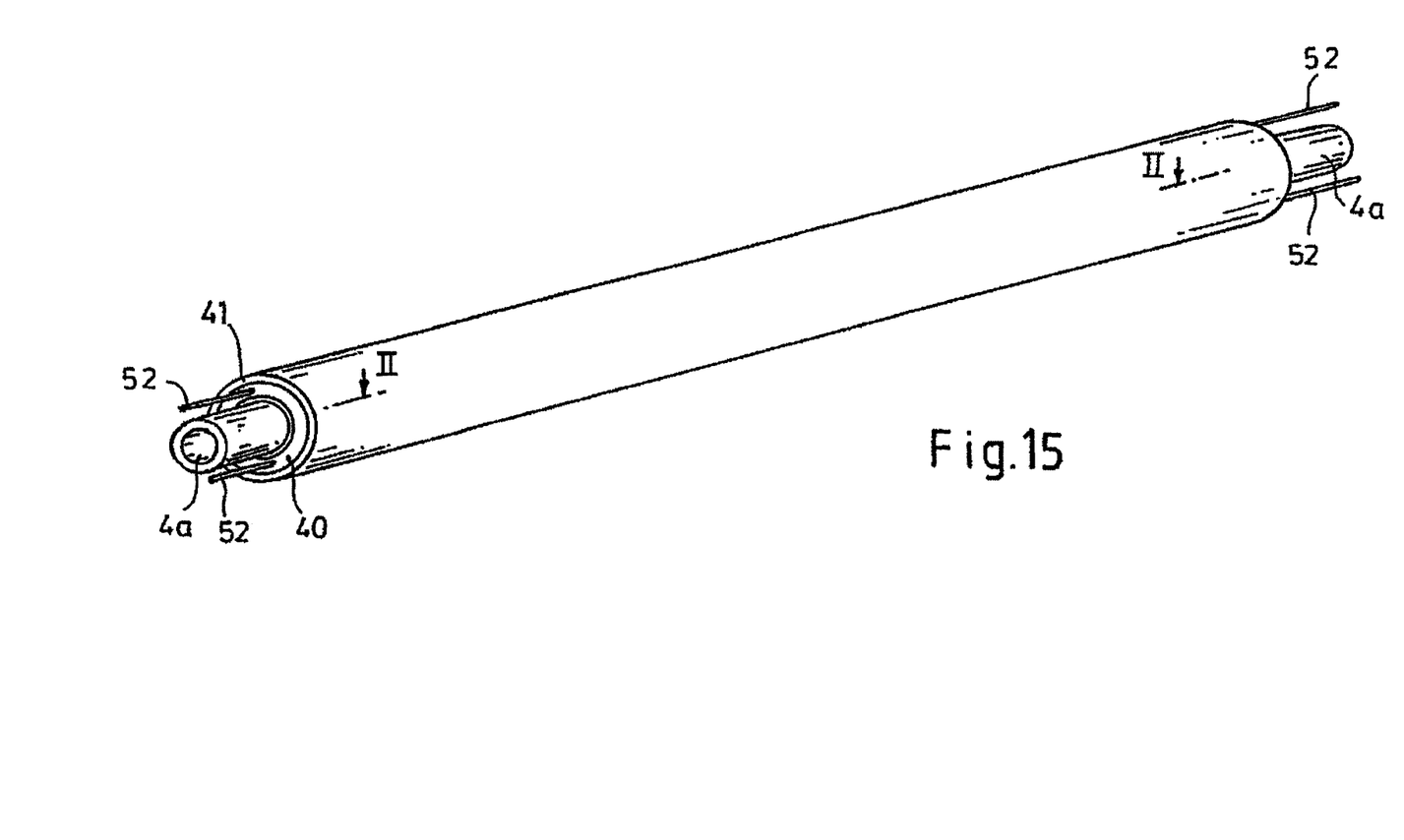
FIG. 15 shows a perspective view of a fluid line according to one aspect of the present invention.

FIGS. 15 to 18 illustrate preferable further versions of a heating conductor according to the invention which is designed in these versions as a sheet-like heating element 40. As illustrated in FIG. 15, a heatable media line according to the invention comprises the inner pipeline 4a and an electric heating element 40 arranged on its surface. A protective casing 41 may be attached circumferentially around the applied electric heating element 40. The pipeline 4a advantageously consists of plastic. The outer protecting casing 41 may be formed from an adhesive tape winding or from an extrusion layer or a shrinkable tube consisting of plastic and forms external protection against damage and moisture. However, a corresponding coating on the outwardly pointing surface of the heating element 40 would also be possible. In addition, the heatable media line is preferably surrounded by a corrugated tube or a protective tube or a protective envelope, specifically, if appropriate, with a circumferential air gap being included.

Figure 16:
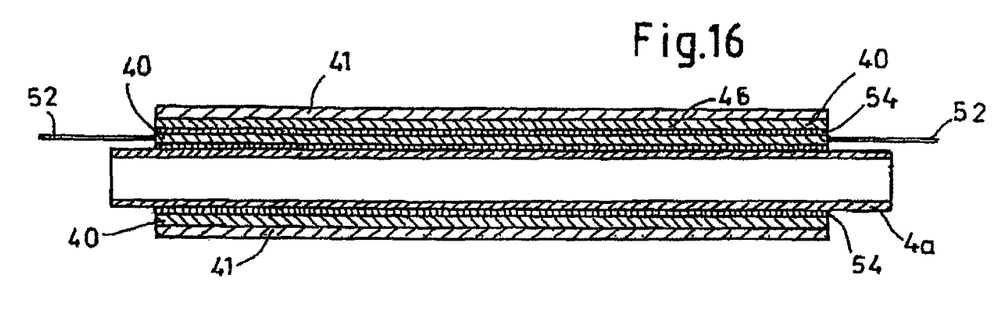
FIG. 16 shows a view of the section taken along the sectional line II-II in FIG. 15.
Figure 17:
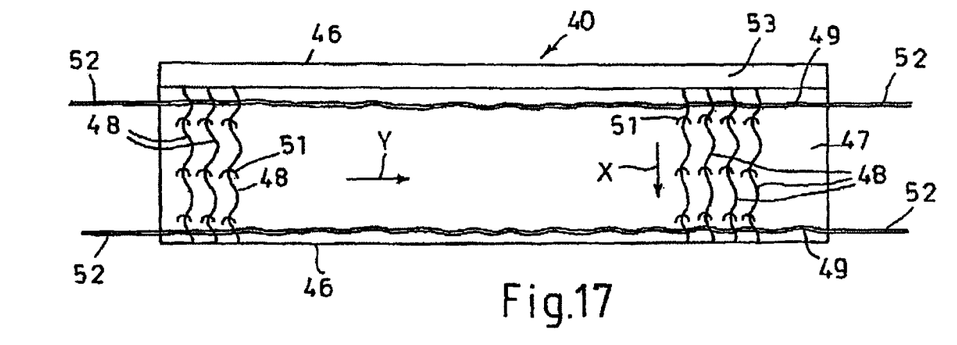
FIG. 17 shows a view of a heating element according to another embodiment of the present invention.

Referring now to FIGS. 16 and 17, the heating element 40 according to one aspect of the present invention is designed as a sheet-like heating element. This sheet-like heating element 40 is strip-shaped and, as illustrated in FIG. 16, may be laid, overlapping with its longitudinal margins 46, around the pipeline 4a so as to run in the longitudinal direction of the pipeline 4a. Alternatively, the longitudinal margins 46 may also butt one against the other.

Figure 18:
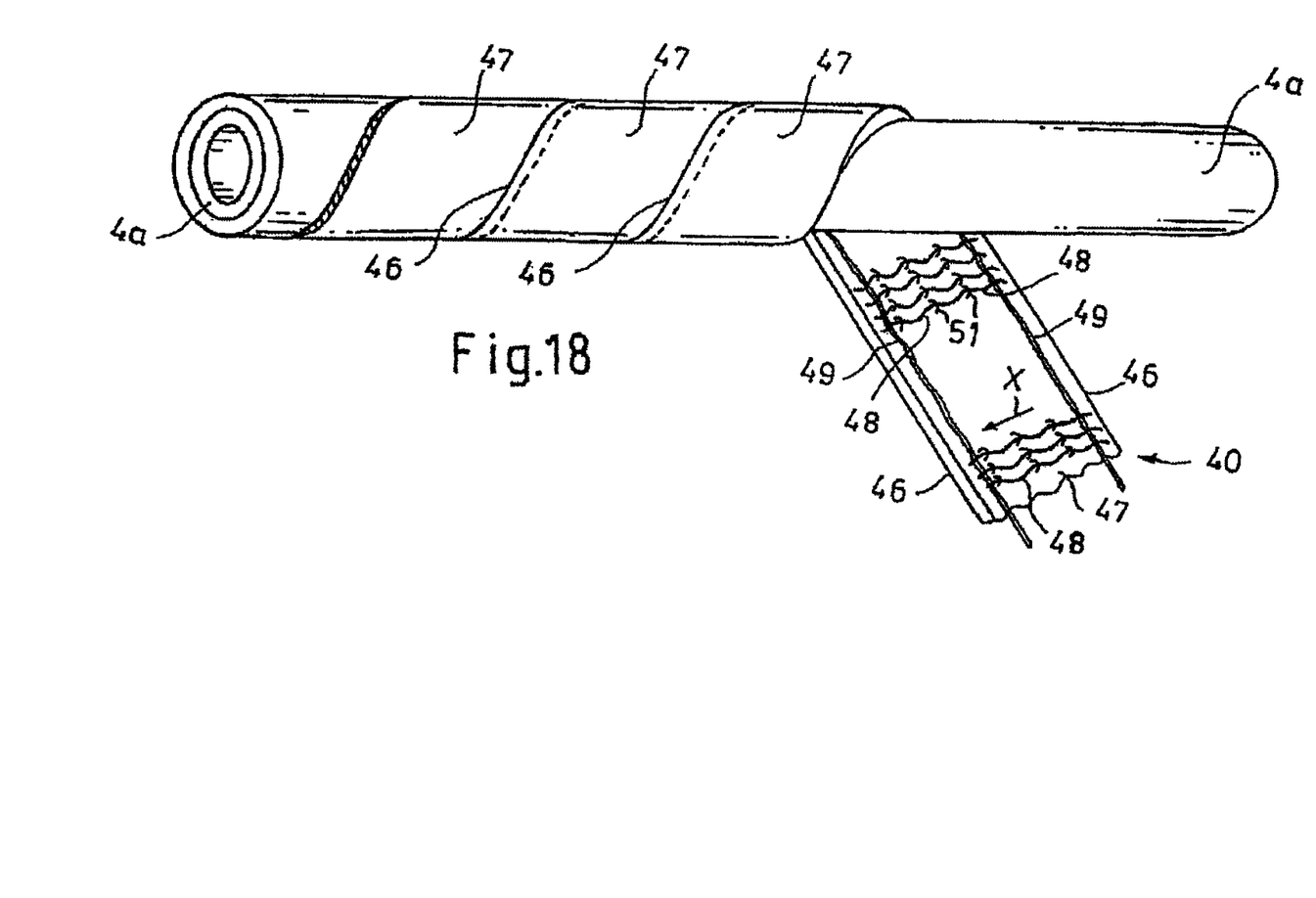
FIG. 18 shows a view of a line pipe and a heating element according to yet another aspect of the invention.

FIG. 18 illustrates, alternatively, that the strip-shaped sheet-like heating element 40 is wound spirally around the pipeline 4a. In this case, it is possible to select an overlapping version of the spiral winding, as illustrated, or else a winding in which the longitudinal margins 46 of the strip-shaped sheet-like heating element 40 butt one against the other.

It is within the scope of the invention to form only one ply consisting of the sheet-like heating element 40 according to one aspect of the present invention or else, in order to increase the heating power, to arrange a plurality of plies of the sheet-like heating element 40 around the pipeline 4a one above the other.

The sheet-like heating element 40 according to one aspect of the present invention consists of a carrier 47 to which electrical heating conductors 48 are fixed. The electrical heating conductors 48 are connected electrically conductively to contact conductors 49 arranged on the carrier 47. This is preferably a carrier 47 consisting of a textile nonwoven material, of a knitted fabric or of a woven fabric. It is likewise possible, however, to form the carrier 47 from a plastic foam or from a combination of the above materials. The electrical heating conductors 48 are laid in a wavy or meander-shaped and/or mesh-like manner on the carrier 47. The electrical heating conductors 48 preferably consist of carbon fibers.

The use of carbon fibers to produce the electrical conductors affords the advantages of very high tensile strength, along with the lowest possible weight and good electrical conductivity; furthermore, transparency with respect to X-rays is thereby afforded, this being advantageous during check inspections. Moreover, resistance to chemicals and high thermal resistance are ensured. Moreover, carbon fibers can be processed easily. The electrical heating conductors 48 are, in particular, arranged, distributed uniformly, over the entire surface of the sheet-like heating element 40. The main direction X of the electrical heating conductors 48 expediently runs in the transverse direction of the strip-shaped carrier 47.

The contact conductors 49, which may likewise consist of carbon fibers or else of metallic material, may run rectilinearly and/or in a wavy manner. Preferably, a plurality of contact conductors 49 running parallel are laid, as is illustrated in FIG. 17. In this case, the contact conductors 49 run transversely, in particular perpendicularly, with respect to the main direction X of the electrical heating conductors 48.

Furthermore, it can be seen in FIGS. 16 and 17 that the contact conductors 49 are arranged in each case at the two end regions of the heating conductors 48 or in the region of the two longitudinal margins 46 of the carrier 47. The heating conductors 48 and the contact conductors 49 are fixed to the carrier 47 by stitching by means of textile stitching threads 51. In this case, the seam direction Y of the stitching threads 51 runs in the main direction X of the heating conductors 48. According to one aspect of the present invention, it may be preferable if the textile carrier is designed to be free of heating conductors only in a part region, in particular in an overlap region 53. This ensures that a uniform heating power is present over the entire line length. It is likewise possible to form the overlap region 53 at both longitudinal margins of the carrier 47.

In order to ensure a simple attachment of the sheet-like heating element 40 on the pipeline 4a, the carrier 47 is preferably coated on its rear side facing away from the heating conductors 48 with a temperature-resistant pressure-sensitive adhesive 54, thus ensuring intimate bearing contact of the heating element 40 on the surface of the pipeline 4a, so that good heat transmission is possible. The carrier 47 preferably has a moisture-repelling finish. The electrical contact conductors 49 are preferably flexible and run between the heating conductors 48 and the carrier 47. The contact conductors 49 are led out at both ends for a series connection of various lines, or preferably only at one of the ends of the line 1 according to one aspect of the present invention, by means of two junction wires 52. It is likewise possible to lead out only one junction wire 52 at each of the two ends.

It is likewise within the scope of the invention if the contact conductors 49 are incorporated into the textile carrier 47. The electrical heating conductors 48 may be arranged to run parallel to one another, but they may also be designed to overlap one another. Such an overlapping arrangement of the heating conductors 48 achieves a uniform contacting of the heating conductors 48 over the entire surface and a uniform current distribution, so that, even in the event of an individual break of a heating conductor portion, there is consequently no appreciable impairment in the heating power. Particularly when a plurality of contact conductors 49 running parallel are present, in which case a wavy arrangement is likewise possible or else a mesh-like composite structure of the contact conductors 49 may be present, reliable contacting with the heating conductors 48 is likewise made possible.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A line connector for media lines comprising a connector piece which is formed as a one-piece molding from plastic, and having at least one junction portion as a socket part for a releasable plug connection or as a plug portion for a junction connection to an assembly or a media line and with a transitional portion contiguous to the junction portions and having a flow duct, comprising in that, at least in the region of the transitional portion, electrical heating means for the media line are provided in an arrangement circumferentially surrounding the flow duct whereby the heating means are formed at least by a resistance wire, which is wound in a coil-like manner on the outside of the connector piece, wherein the connector piece has form elements for guiding and fixing the resistance wire attached on the outside of the connector piece, wherein the connector piece together with the heating means is surrounded by an outer cladding, at least one of the junction portions being designed as a hollow-cylindrical receptacle for directly plugging in the end of the media line, the media line being capable of being fastened in a materially integral manner, whereby the junction portion includes, at least in regions, a material transparent to laser beams in such a way that the media line can be fastened by means of laser beam welding.

2. The line connector as claimed in claim 1, wherein the outer cladding is designed for heat insulation with low heat conductivity, the cladding being formed as an outer housing having two symmetrical housing halves which form two half shells of the outer housing or as an injection-molded part entirely around the connector piece.

3. The line connector as claimed in claim 2, wherein the cladding is designed for surrounding one end of the media line and one end of a line sheathing of the media line.

4. The line connector as claimed in claim 2, wherein an air volume for heat distribution and heat insulation is enclosed between the cladding and the connector piece.

5. The line connector as claimed in claim 3, wherein the cladding is connected with a form fit to the connector piece with orifices in the outer housing being present, which serve for leading out connecting wires for the junction of the heating means, these orifices lying in the parting plane of the outer housing.

6. A ready-made media line, comprising a media line with a heating conductor arranged on the circumference and a heatable line connector comprising a connector piece which is formed as a one-piece molding from plastic, and having at least one junction portion as a socket part for a releasable plug connection or as a plug portion for junction connection to an assembly or a media line and with a transitional portion contiguous to the junction portions and having a flow duct, comprising in that, at least in the region of the transitional portion, electrical heating means for the media line are provided in an arrangement circumferentially surrounding the flow duct whereby the heating means comprising at least one resistance wire, which is wound in a coil-like manner on the outside of the connector piece, wherein the connector piece has form elements for guiding and fixing the resistance wire attached on the outside of the connector piece, wherein the connector piece together with the heating means is surrounded by an outer cladding, at least one of the junction portions being designed as a hollow-cylindrical receptacle for directly plugging in the end of the media line, the media line being capable of being fastened in a materially integral manner, whereby the junction portion includes, at least in regions, a material transparent to laser beams in such a way that the media line can be fastened by means of laser beam welding, whereby comprising that a sheathing, in the form of a corrugated tube, surrounds the media line having the heating conductor, the sheathing being led into the cladding of the line connector and being connected with a form fit, and whereby the heating conductor surrounds the media line spirally and consists of two sire windings running parallel, and whereby the heating conductor is a resistance wire or resistance wires surrounding the media line are connected electrically to one another to form a series connection or to form two series connections.

7. The ready-made media line as claimed in claim 6, further comprising a sealing compound between the cladding and the connector piece and in a connection region of the line sheathing within the cladding.

* * * * *